United States Patent [19]

Small

[11] Patent Number: 5,089,108
[45] Date of Patent: Feb. 18, 1992

[54] STRAINER

[76] Inventor: Robert M. Small, Apt. 6A, 1480 Route 46, Parsippany, N.J. 07054

[21] Appl. No.: 542,535

[22] Filed: Jun. 25, 1990

[51] Int. Cl.⁵ ............................................. B01D 24/16
[52] U.S. Cl. .................... 210/287; 210/263; 210/377; 210/416.2; 210/435; 210/437; 210/441; 210/460; 210/484
[58] Field of Search ............ 210/263, 287, 377, 416.2, 210/435, 437, 441, 460, 484, 416.4, 172, 169

[56] References Cited

U.S. PATENT DOCUMENTS

| | | | |
|---|---|---|---|
| 3,526,323 | 9/1970 | Smith | 210/460 |
| 4,428,835 | 1/1984 | Nagashima | 210/172 |
| 4,626,347 | 12/1986 | Neglio | 210/416.4 |
| 4,717,477 | 1/1988 | Nagashima | 210/172 |

Primary Examiner—Robert A. Dawson
Assistant Examiner—David Reifsnyder
Attorney, Agent, or Firm—Bernard J. Murphy

[57] ABSTRACT

The Strainer has a pipe with a multiplicity of holes, and surrounded by a mass of stones or marbles, confined within a double nylon netting. The pipe confines a one-way check valve. The mass of stones or marbles serves a dual purpose: weighting of the Strainer, and ancillary filtering of the fluid. The stones or marbles are of approximately three-quarters of an inch in diameter and, consequently, they have a multitudinous number of interstices which are not less than three-sixteenth of an inch in width, length and depth. These present virtually unlimited pathways, of gross dimensions, for the extraction of water.

12 Claims, 1 Drawing Sheet

STRAINER

This invention pertains to filters and strainers, and the like, and in particular to strainers which are weighted and especially configured to extract water from swimming pool covers.

Strainers of the type to which the invention pertains are generally exemplified by the U.S. Pat. No. 4,428,835, issued to Akira Nagashima, on Jan. 31, 1984, for a Strainer. The patented strainer has a sperical shell of foraminous material, and therewithin confines a metallic, ball-like weight. All fluid straining is performed by the shell, and the only function of the weight is to make the strainer heavy enough for its purposes.

It is an object of this invention to set forth a novel strainer in which there is staged filtering or straining, and means are provided which serves a dual function of weighting of the strainer and fluid filtering.

Particularly is it an object of this invention to set forth a strainer comprising a compliant foraminous container; a pipe having one end thereof confined, generally centrally, in said container; and means surrounding said one end of said pipe, and confined within said container the same means both; (a) weighting said strainer, and (b) filtering fluids.

Further objects of this invention, as well as the novel features thereof, will become more apparent by reference to the following description taken in conjunction with the accompanying figures, in which.

Figure 2:
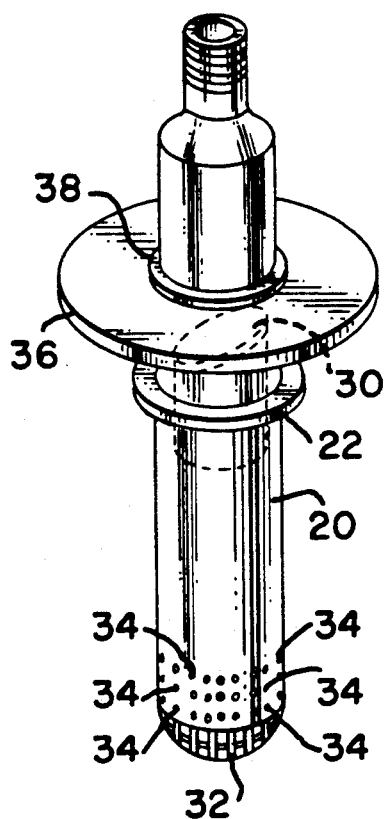
FIG. 2 is a perspective illustration of the embodiment of FIG. 1, less the aggregate and net container.
Figure 1:
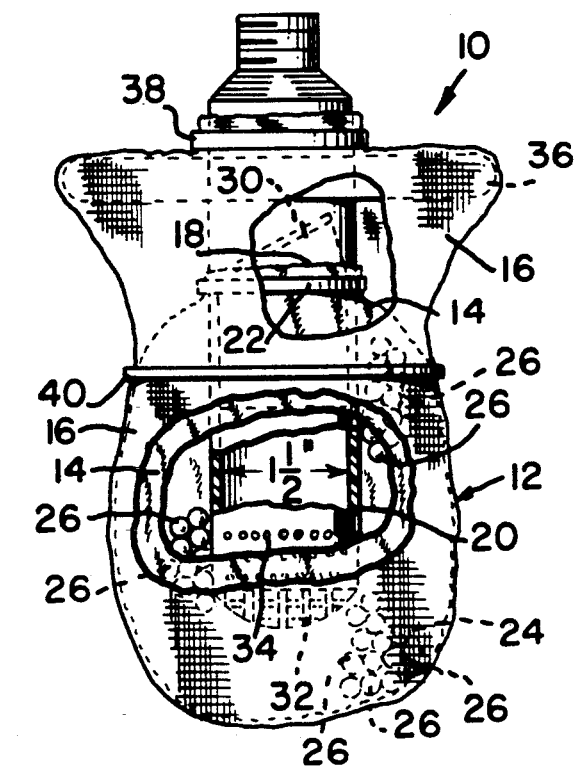
FIG. 1 is a side elevational view of the novel strainer, according to an embodiment thereof.
Figure 3:
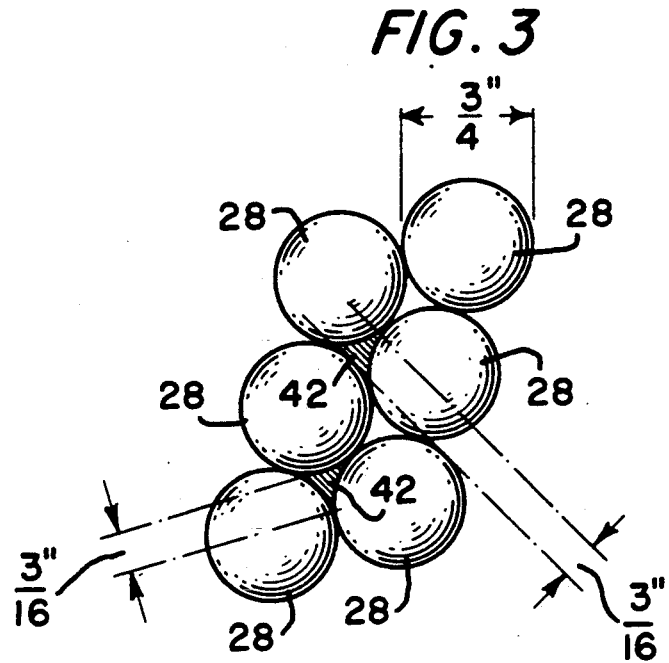
FIG. 3 is a depiction of the size of the interstices obtaining in the aggregate mass.

As shown in the figures, the novel strainer 10 comprises a compliant container 12, the latter comprising two sacks of nylon net 14 and 16, net sack 16 has net sack 14 confined therewithin. The innermost net sack 14 is clasped at the open end 18 thereof about a pipe 20 by means of a clamp 22. Surrounding the pipe 20, and held within the net sack 14 is a mass of aggregate 24. The aggregate comprises hard, inert material, such as substantially rounded stones 26 (FIG. 1) or marbles 28 (FIG. 3) each of the stones and marbles being of approximately three-quarters of an inch in diameter. The pipe 20 has an inside diameter of substantially one and a half inch and interposed therein, intermediate the length thereof, is a check valve 30. It permits fluid flow upwardly through the pipe, and prevents counter-flow downwardly through the pipe.

The lowermost end of the pipe 20 has a grating 32 fixed thereto and thereabove, adjacent to the innermost termination of the pipe, is formed a multiplicity of holes 34. The pipe 20 is in penetration of a centrally-apertured plate 36, and the open end of the outermost net sack 16 is closed about the plate 36 and gathered thereabove and held fast by means of another clamp 38. Finally, a further band 40 tightens the outermost net sack 16 about the uppermost portion of the aggregate-confining net sack 14. The uppermost termination of the pipe 20 is threaded to accommodate its coupling to a hose, or the like, from a source of vacuum power (i.e., vacuum pump).

The strainer 10 is especially designed for use in extracting water which has collected on swimming pool covers, albeit it has a myriad of applications. Swimming pool covers become depositories of water, leaves, sticks, and the like, and it requires a strainer which is weighted and thrown thereon to form a depression into which the water will collect. The cited U.S. Pat. No. 4,428,835 shows just such a weighted strainer, but the weight serves no purpose other than to render the strainer heavy enough to form such an aforesaid depression. The instant invention, however, provides means, in the stones 26 or marbles 28, for weighting the strainer, and for filtering the water as well. Fragments of leaves, or twigs, and the like, which insinuate themselves through the nylon nets 14 and 16 will become mired in the interstices of the stones or marbles 26 and 28. Too, the interstices 40 (shown lined in FIG. 3) are multitudinous, offering the water virtually unlimited paths for egress, even if the nylon net 16 is partially sealed off by leaves and the like. The interstices 40, because the stones or marbles 26 and 28 have three-quarter-inch diameters, are approximately three-sixteenth of an inch in width—or, really, in any measure (width, length and depth). They offer gross channels for the water, unlike compacted sand, or such.

While I have described my invention in connection with a specific embodiment thereof, it is to be clearly understood that this is done only by way of example, and not as a limitation to the scope of my invention, as set forth in the object thereof and in the appended claims.

I claim:

1. A strainer, comprising:
   a compliant foraminous container;
   a pipe having one end thereof confined, generally centrally, in said container; and
   means surrounding said one end of said pipe, and confined within said container, the same means both; (a) weighting said strainer, and (b) filtering fluids.

2. A strainer, according to claim 1, wherein: said weighting and filtering means comprises aggregate.

3. A strainer, according to claim 2, wherein: said aggregate comprises hard, inert material.

4. A strainer, according to claim 1, further including:
   a centrally apertured plate; and wherein
   said pipe is in penetration of said plate.

5. A strainer, according to claim 1, wherein:
   said pipe, at the end thereof opposite said one end, is externally threaded.

6. A strainer, according to claim 1, wherein:
   said pipe has an inside diameter of approximately one and a half inch.

7. A strainer, comprising:
   a compliant foraminous container;
   a pipe having one end thereof confined, generally centrally, in said container; and
   means surrounding said one end of said pipe, and confined within said container, for (a) weighting said strainer, and (b) filtering fluids; wherein
   said weighting and filtering means comprises a mass of stones; and
   each of said stones is substantially rounded, and is of approximately three-quarters of an inch in diameter.

8. A strainer, comprising:
   a compliant foraminous container;
   a pipe having one end thereof confined, generally centrally, in said container; and means surrounding said one end of said pipe, and confined within said container, for (a) weighting said strainer, and (b) filtering fluids; wherein said weighting and filtering means comprises a mass of marbles; and each of said marbles is rounded, and is of approximately three-quarters of an inch in diameter.

9. A strainer, comprising:

a compliant foraminous container;

a pipe having one end thereof confined, generally centrally, in said container; and means surrounding said one end of said pipe, and confined within said container, the same means both; (a) weighting said strainer, and (b) filtering fluids; wherein said container comprises nylon net; and further including a grating coupled to the termination of said one end of said pipe; and a check valve confined within said one end of said pipe.

10. A strainer, according to claim 9, wherein: a portion of said pipe, immediately adjacent to said termination thereof, has a multiplicity of holes formed therein.

11. A strainer, comprising:

a compliant foraminous container a pipe having one end thereof confined, generally centrally, in said container; and means surrounding said one end of said pipe, and confined within said container, for (a) weighting said strainer, and (b) filtering fluids; wherein said weighting and filtering means comprises aggregate; and said aggregate, in total, weighs approximately ten pounds.

12. A strainer, comprising:

a compliant foraminous container;

a pipe having one end thereof confined, generally centrally, in said container; and means surrounding said one end of said pipe, and confined within said container, for (a) weighting said strainer, and (b) filtering fluids; wherein said weighting and filtering means comprises aggregate; and said aggregate has interstices of not less than approximately one-eighth of an inch in width.

* * * * *